(12) United States Patent
Vanko et al.

(10) Patent No.: US 8,476,853 B2
(45) Date of Patent: Jul. 2, 2013

(54) REDUNDANT OVERSPEED PROTECTION FOR POWER TOOLS

(75) Inventors: John C. Vanko, Timonium, MD (US); Robert A. Usselman, Forest Hill, MD (US); David Beers, Dallastown, PA (US)

(73) Assignee: Black & Decker Inc., Newark, DE (US)

( * ) Notice: Subject to any disclaimer, the term of this patent is extended or adjusted under 35 U.S.C. 154(b) by 327 days.

(21) Appl. No.: 12/875,354

(22) Filed: Sep. 3, 2010

(65) Prior Publication Data

US 2011/0056715 A1 Mar. 10, 2011

Related U.S. Application Data

(60) Provisional application No. 61/239,959, filed on Sep. 4, 2009.

(51) Int. Cl.
*H02H 7/08* (2006.01)

(52) U.S. Cl.
USPC ...... 318/400.21; 318/494; 318/257; 318/255; 318/806; 318/34; 363/33; 173/176; 173/217; 388/937

(58) Field of Classification Search
USPC ...... 318/494, 257, 53, 34, 255, 806; 388/937; 361/33; 173/176, 217
See application file for complete search history.

(56) References Cited

U.S. PATENT DOCUMENTS

| | | | |
|---|---|---|---|
| 3,883,785 A | 5/1975 | Fulcher et al. | |
| 3,921,047 A | 11/1975 | Carter et al. | |
| 3,936,710 A | 2/1976 | Tanikoshi | |
| 4,622,500 A | 11/1986 | Budelman, Jr. | |
| 4,629,980 A | 12/1986 | Overby | |
| 4,709,195 A | 11/1987 | Hellekson et al. | |
| 5,670,852 A | 9/1997 | Chipperfield et al. | |
| 5,864,454 A * | 1/1999 | Zaretsky | 361/127 |
| 5,986,417 A * | 11/1999 | Nicolai et al. | 318/245 |
| 7,274,866 B2 | 9/2007 | Rudolf et al. | |
| 7,372,226 B2 * | 5/2008 | Wiker et al. | 318/367 |
| 7,518,324 B2 | 4/2009 | Nolan et al. | |
| 8,076,873 B1 * | 12/2011 | Lucas et al. | 318/107 |
| 8,160,433 B2 * | 4/2012 | Bedingfield et al. | 392/315 |
| 8,274,866 B2 * | 9/2012 | Sekine | 369/13.33 |
| 2003/0202302 A1 * | 10/2003 | Manning et al. | 361/88 |
| 2004/0090195 A1 | 5/2004 | Motsenbocker | |
| 2007/0097566 A1 * | 5/2007 | Woods et al. | 361/33 |

FOREIGN PATENT DOCUMENTS

| | | |
|---|---|---|
| DE | 3119794 | 12/1982 |
| DE | 3432845 | 3/1986 |
| DE | 4021559 | 12/1991 |

\* cited by examiner

*Primary Examiner* — Walter Benson
*Assistant Examiner* — Jorge L Carrasquillo
(74) *Attorney, Agent, or Firm* — Harness, Dickey & Pierce, P.L.C.

(57) ABSTRACT

An overspeed protection subsystem is provided for a power tool having an electric motor. The overspeed protection subsystem is comprised of: a motor switch coupled in series with the motor; a motor control module interfaced with the motor switch to control switching operation of the motor switch; and an overspeed detection module that determines rotational speed of the motor and disables the power tool when the rotational speed of the motor exceeds a threshold.

18 Claims, 13 Drawing Sheets

US 8,476,853 B2

REDUNDANT OVERSPEED PROTECTION FOR POWER TOOLS

CROSS-REFERENCE TO RELATED APPLICATIONS

This application claims the benefit of U.S. Provisional Application No. 61/239,959, filed on Sep. 4, 2009. The entire disclosure of this application is incorporated herein by reference.

FIELD

The present disclosure relates to power tools and, more particularly, to an overspeed protective subsystem for power tools.

BACKGROUND

Power tools historically have utilized electric motors that are designed to meet anticipated loads experiences by the tool. More recently, power tools have begun to make use of smaller electric motors that are capable of operating at very high rotational speeds. In the event of a malfunction, the rotational speeds of the motor may exceed prescribed safety regulations. Therefore, it is desirable to provide an overspeed protection subsystem for incorporation into power tools having electric motors This section provides background information related to the present disclosure which is not necessarily prior art.

SUMMARY

An overspeed protection subsystem is provided for a power tool having an electric motor. The overspeed protection subsystem is comprised of: a motor switch coupled in series with the motor; a motor control module interfaced with the motor switch and controls switching operation of the motor switch; and an overspeed detection module that determines rotational speed of the motor and disables the power tool when the rotational speed of the motor exceeds a threshold.

In one aspect of the disclosure, the motor control module is interfaced with the phase-controlled switch and modulates the conductive state of the phase-controlled switch at a predetermined phase of the AC input signal. The overspeed detection module receives the predetermined phase from the motor control module and determines the rotational speed of the motor as a function of the predetermined phase and a measured current through the motor.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
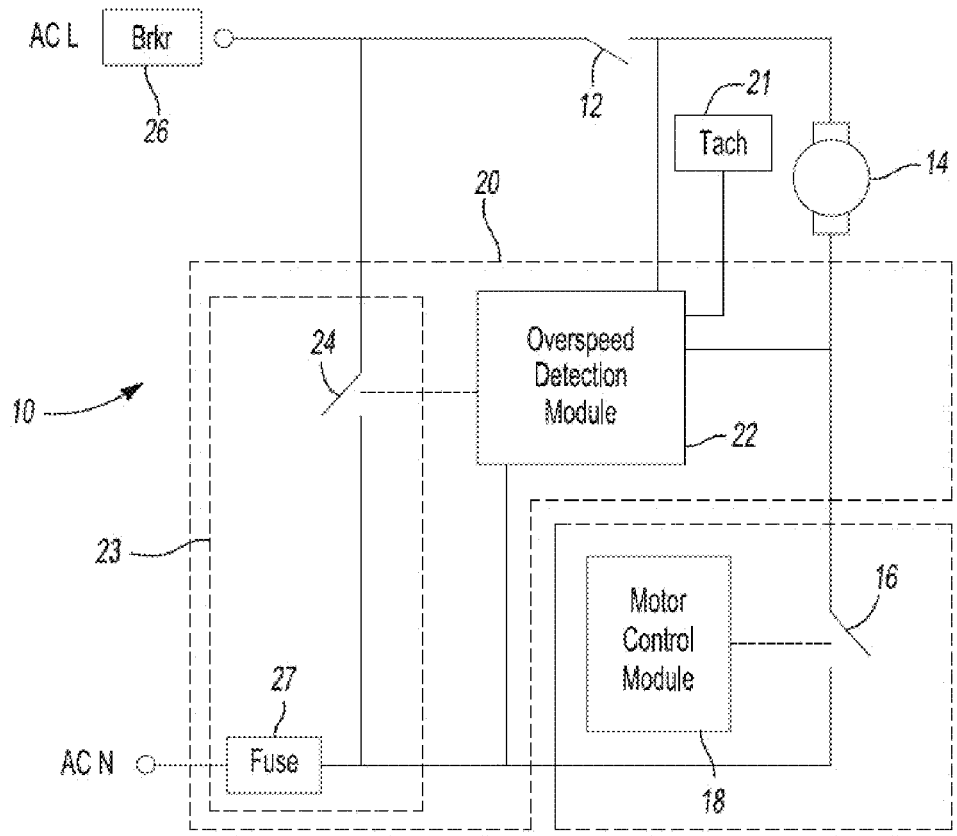
FIG. 1 is a simplified circuit diagram of a motor control system having an overspeed protection subsystem.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 depicts a simplified circuit diagram of a motor control system 10 for controlling a motor in a power tool. The motor control system 10 is comprised generally of a power on/off switch 12, an electric motor 14, a motor switch 16 coupled in series with the motor 14, and a motor control module 18 interfaced with the motor switch 16. In an exemplary embodiment, the motor is a universal motor and the motor switch is a triac but it is readily understood that other types of motors and switches fall within the scope of this disclosure. For example, the motor may be an AC motor or DC motor, including brushed or brushless; whereas, the motor switch may be a field effect transistor (FET), an insulated gate bipolar transistor (IGBT), a silicon-controlled rectifier (SCR), or another type of electronic switch. The motor switch may also be replaced with an H-bridge, half-bridge or some other motor switching arrangement. In some embodiments, the motor switch may be incorporated into the motor control module. The motor control system is connectable to a power source. In the exemplary embodiment, the motor control system is connectable to an AC power source at AC main node and AC neutral node. The connection may be made in a conventional manner via a power cord to an AC outlet. However, it is envisioned that the overspeed protection subsystem further described below is applicable to power tools having DC power sources as well.

During operation, the motor control module 18 controls the amount of voltage applied to the motor 14 by controlling the switching operation of the motor switch 16. As used herein, the term module may refer to, be part of, or include an electronic circuit, an Application Specific Integrated Circuit (ASIC), a processor (shared, dedicated, or group) and/or memory (shared, dedicated, or group) that execute one or more software or firmware programs, a combinational logic circuit, and/or other suitable components that provide the described functionality.

In an exemplary embodiment, the motor control module 18 employs phase control to control the amount of voltage applied to the motor 14. Generally, operation of the motor 14 is controlled by switching the motor current on and off at periodic intervals in relation to the zero crossing of the AC input signal. These periodic intervals are caused to occur in synchronism with the waveform of the AC signal and are measured in terms of a conduction angle, measured as a number of degrees. The conduction angle determines the point within the AC waveform at which the motor switch is fired (i.e., closed), thereby delivering current to the motor. For example, a conduction angle of 180° per half cycle corresponds to a condition of full or maximum conduction. That is, the motor switch 16 is fired such that current flows through the switch for the entire half cycle of the AC input signal. Similarly, a 90° conduction angle commences current flow in the middle of the half cycle and thus half the available energy is delivered to the motor. Thus, the conduction angle is expressed as an angle from 0 to 180 degrees and determines the point at which the motor switch is fired. Reference is also made to firing point, the complement of conduction angle, which is expressed as an angle from 180 to 0 degrees. While the following description is provided with reference to phase control, it is readily understood that other motor control schemes (e.g., pulse width modulation) are within the broader aspects of this disclosure.

The motor control system 10 further includes an overspeed protection subsystem 20. The overspeed protection subsystem 20 monitors the rotational speed of the motor 14 and disables the motor and/or the power tool when the rotational speed of the motor exceeds a threshold. The overspeed protective subsystem 20 is comprised of an overspeed detection module 22 and a disabling circuit 23. Different arrangements for the overspeed protection subsystem 20 are contemplated as will be further described below.

In an exemplary embodiment, a tachometer 21 is used to determine the rotational speed of the motor. The tachometer is disposed proximate to the motor 14 and configured to determine the rotational speed of the motor. An output signal indicative of speed is output from the tachometer into the overspeed detection module 22. It is readily understood that other types of sensors may be used to directly measure the speed of the motor. Likewise, the overspeed protective subsystem 20 may employ indirect means for estimating the speed of the motor as further described below.

Figure 2:
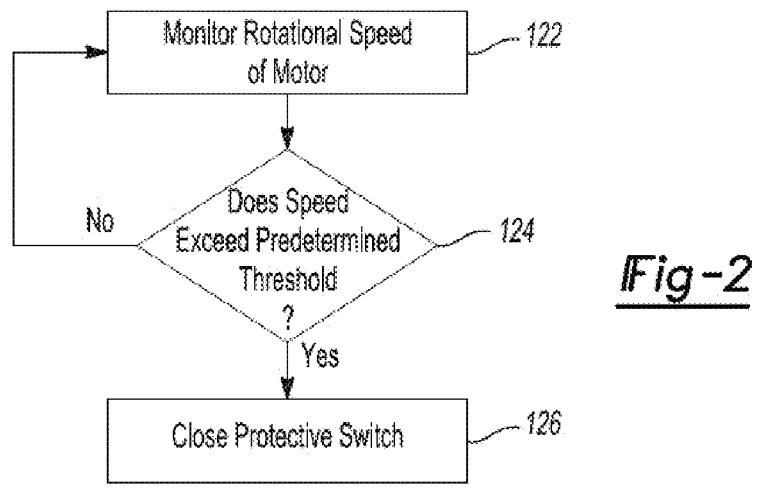
FIG. 2 is a flowchart illustrating the operation of an overspeed detection module.

With reference to FIG. 2, the overspeed detection module 22 operates to determine when the rotational speed of the motor exceeds a threshold. Rotational speed of the motor is monitored at 122 using, for example, the input from tachometer 21. The rotational speed is then compared at 124 to a predefined threshold. When the rotational speed of the motor exceeds the threshold, the overspeed detection module 22 acts to disable the motor at 126; otherwise, motor speed continues to be monitored by the subsystem. In an exemplary embodiment, the above functionality may be implemented by software instructions embedded in a microprocessor. It is to be understood that only the relevant steps of the methodology are discussed in relation to FIG. 2, but that other software instructions, or other electronic circuits, may be needed to control and manage the overall operation of the system. The above functionality may also be implemented exclusively using electronic circuits.

With continued reference to FIG. 1, the disable circuit 23 may include a protective switch 24, a circuit breaker 26 and/or a fuse 27. In this exemplary embodiment, the protective switch 24 is connected across the AC line (i.e., coupled between the AC main line and the AC neutral or return line). In addition, a circuit breaker 26 and/or a fuse 27 are disposed in the circuit path between the AC power source and the protective switch. When an overspeed condition is detected, the overspeed detection module 22 closes the protective switch 24, thereby shorting the AC line. The sudden flow of current will trip the circuit breaker and/or blow the fuse, thereby disabling operation of the power tool. Protective switch 24 may be implemented using a field effect transistor (FET), an insulated gate bipolar transistor (IGBT), a silicon-controlled rectifier (SCR), a triac, a solid-state relay, a mechanical relay or another type of switch, with the required attendant circuitry. Other techniques for disabling the motor and/or the power tool fall within the scope of this disclosure.

Figure 3:
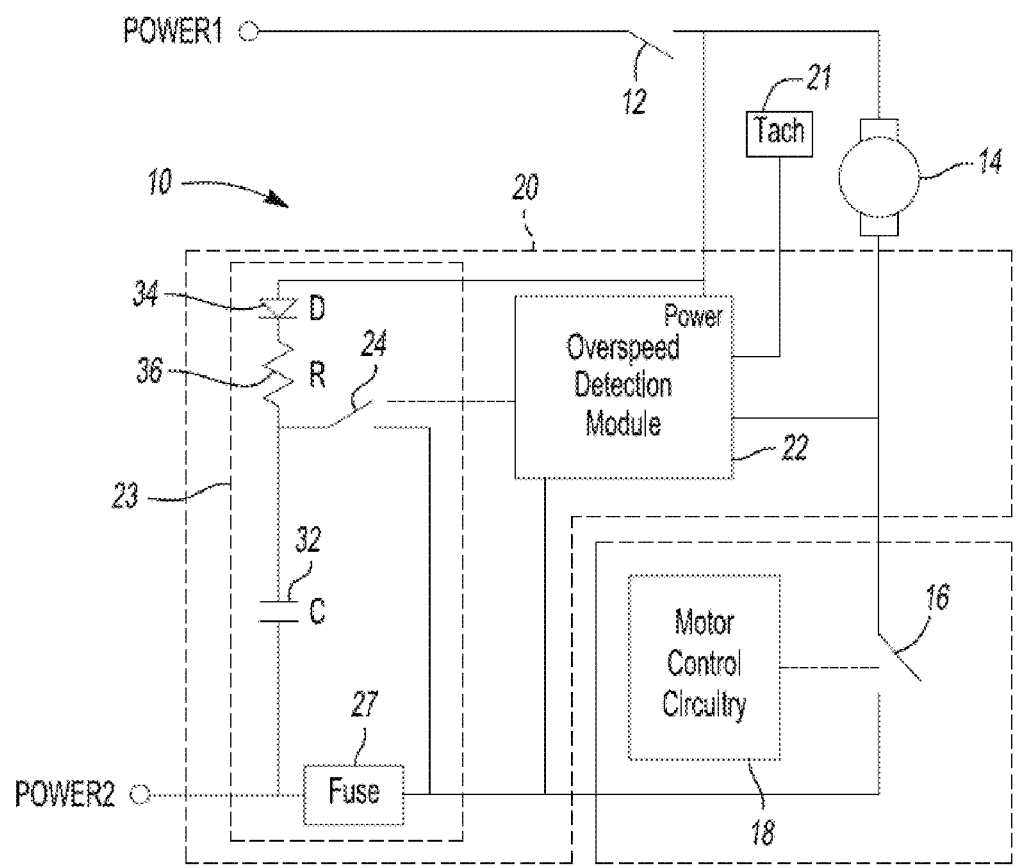
FIG. 3 is a diagram depicting an alternative embodiment of the disabling circuit.

It is contemplated that there may be insufficient energy to blow the fuse or trip the circuit breaker. FIG. 3 depicts an alternative embodiment for the disabling circuit 23. In this embodiment, a capacitor 32 is placed in parallel with the protective switch 24. During normal operation of the motor 14, the capacitor 32 is charged through a diode 34 and a resistor 36 that limit the inrush of current into the capacitor. When the overspeed detection module 22 detects an overspeed condition, it closes the protective switch 24. The energy stored in the capacitor 32 discharges into the fuse and thereby blows the fuse. It is envisioned that the capacitor 32 may be replaced with or used in combination with other types of energy storing devices, such as inductors. It is further understood that the disabling circuit 23 may be reconfigured to support such devices.

The overspeed protection subsystem 20 may operate independently from the motor control module 18, thereby providing a redundant safety feature. Alternatively, the overspeed protection subsystem 20 may operate cooperatively with the motor control module 18. For example, upon detecting an overspeed condition, the overspeed detection module 22 provides a disabling signal to the motor control module 18. In response to the disabling signal, the motor control module 18 opens the motor switch 16 and thereby discontinues motor operation, thereby providing an additional or alternative technique for disabling the power tool. In another variant, the overspeed detection module 22 may communicate with the motor control module 18 as the rotational speed of the motor approaches but before it exceeds the maximum speed threshold. For example, the overspeed detection module 22 may issue a warning signal to the motor control module 18 when the rotational speed exceeds an intermediate speed threshold (e.g., define at 200 rpm less than the maximum speed threshold). In response to this warning signal, the motor control module 18 may initiate protective actions to reduce the motor speed by varying the phase at which the motor switch is closed. In this way, the motor speed is reduced before the maximum speed threshold is reached, thereby averting the need to blow a fuse or otherwise disable the tool.

Figure 4:
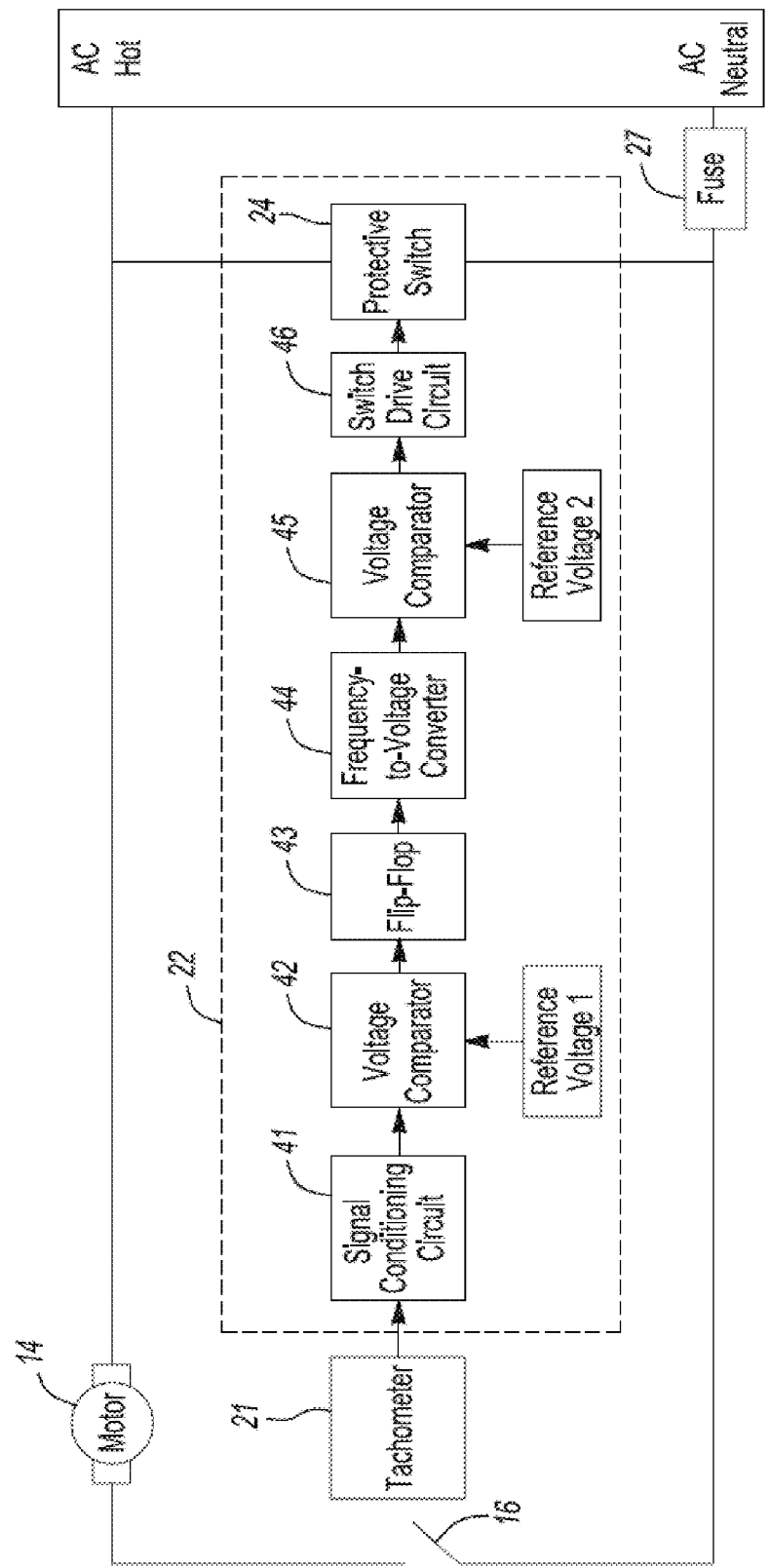
FIG. 4 is a block diagram depicting an exemplary embodiment of the overspeed detection module.

FIG. 4 illustrates an exemplary implementation of the overspeed detection module 22. In this embodiment, the overspeed detection module 22 is comprised of a signal conditioning circuit 41, a first voltage comparator 42, a bistable multivibrator, more commonly known as a flip-flop circuit 43, a frequency-to-voltage converter 44, a second voltage comparator 45 and a switch drive circuit 46. It is envisioned that one or more of these circuit components may be replaced with other circuit components that provide similar functions.

A tachometer 21 is used to determine rotational speed of the motor. The tachometer may be further defined as a Hall effect sensor affixed to a non-moving reference frame and a magnet affixed to the rotating armature of the motor. In this case, the signal output by the tachometer 21 contains a fundamental frequency that is proportional to the rotational speed of the motor. Other implementations for the tachometer are also contemplated.

In operation, the tachometer signal serves as input to the signal conditioning circuit 41. The signal conditioning circuit 41 operates to amplify or attenuate the signal from the tachometer 21, or to filter it as required by the nature of the signal or the noise environment. Output of the signal conditioning circuit 41 connects to the input of a first voltage comparator 42.

First voltage comparator 42 operates to convert the analog input signal to a digital output signal. More specifically, the first voltage comparator produces a bi-level output depending upon the relative magnitude of the output signal from the signal conditioning circuit 41 in relation to a first reference voltage. When the analog input is greater than the reference voltage, then the output of the voltage comparator is low (i.e., the lesser of two output levels). When the analog input is less than the reference voltage, then the output of the voltage comparator is high. The first reference voltage may be adjusted as required to ensure an output of high integrity.

Output of the first voltage comparator 42 serves an input to a flip-flop circuit 43. More specifically, a T or toggle flip-flop circuit is used to generate a digital signal having a 50% duty cycle. Output from the T flip-flop circuit is in turn input to a frequency-to-voltage converter 44. Output of the frequency-to-voltage converter 44 is a voltage proportional to the frequency of the input signal. In some embodiments, the frequency-to-voltage converter 44 may not require an input having a 50% duty cycle and thus the use of a T flip-flop circuit can be avoided.

To detect an overspeed condition, the voltage signal from the frequency-to-voltage converter 44 is compared to a reference voltage by a second voltage comparator 45. The reference voltage input to the second voltage comparator 45 is set to a value corresponding to a maximum speed threshold. When the voltage signal from the frequency-to-voltage converter 44 exceeds the threshold, a triggering signal is output to a switch drive circuit 46 which in turn closes the protective switch 24 in disabling circuit 23. The switch drive circuit 46 may include circuitry to ensure the output of the second voltage comparator 45 exceeds some time limit before the drive circuit 46 triggers the closing of the protective switch. Disabling circuit 23 operates in the manner set forth above to thereby short the AC line and disable operation of the power tool.

The overspeed protection subsystem 20 may further include a motor switch protection circuit. Briefly, the motor switch protection circuit monitors the switching operation of the motor switch 16 and initiates one or more protective operations to protect to the tool operator when the switching operation of the motor switch fails. For example, in a phase-control motor control scheme, the motor switch may fuse closed and cause the tool to operate at high speeds. Different arrangements for the motor switch protection circuit are set forth in U.S. Provisional Application No. 61/239,959, filed on Sep. 4, 2009, which is incorporated by reference herein.

Figure 5:
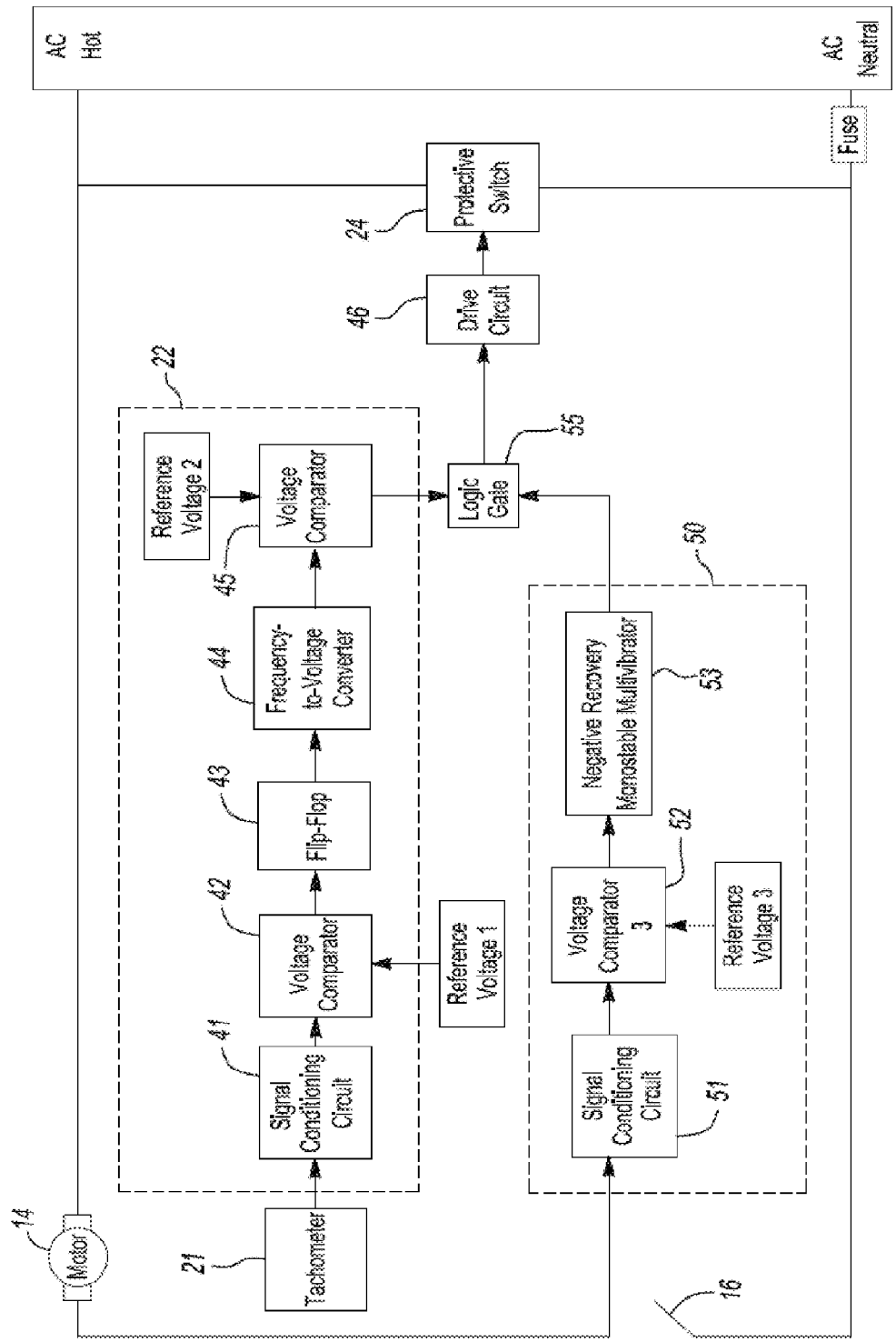
FIG. 5 is a block diagram depicting an overspeed protection subsystem that integrates a motor switch protection circuit with the overspeed detection module shown in FIG. 4.

FIG. 5 depicts an overspeed protection subsystem 20 that integrates an exemplary motor switch protection circuit 50 with the overspeed detection module 22 described in FIG. 4. The exemplary motor switch protection circuit 50 is comprised of a signal conditioning circuit 51, a voltage comparator 52 and a monostable multivibrator 53. This motor switch protection circuit is exemplary in nature and one or more of its circuit components may be replaced with other circuit components that provide similar functions.

In operation, the signal conditioning circuit 51 receives a measure of the voltage across the motor switch 16. In an exemplary embodiment, the signal conditioning circuit 51 is further defined as an attenuator and/or a low-pass filter which may be differential or referenced to AC neutral. Output of the signal conditioning circuit 51 is input to the voltage comparator 52.

In a phase-controlled control scheme, voltage is expected to develop across the motor switch during the first few degrees of every AC cycle. When the measured voltage exceeds some predetermined threshold (e.g., 7 volts), then the motor switch (e.g., a triac) is operating properly; otherwise, the switch is presume to have failed. The voltage comparator 52 compares the voltage across the switch 16 to a reference voltage that is correlated to the threshold. When the voltage across the switch is greater than the reference voltage, then the output of the voltage comparator 52 is low (i.e., lesser of two output levels). When the voltage of the switch is less than the reference voltage, then the output of the voltage comparator 52 is high. The output of the voltage comparator serves as the input trigger to a negative recovery monostable multivibrator 53.

The negative recovery monostable multivibrator 53 provides an output so long as trigger pulses continue to be received at the input. When trigger pulses cease to be received, within the time determined by the accessory components around the multivibrator 53, then the output goes to the inactive state after the determined time. Being a digital device the negative recovery monostable multivibrator 53 has binary output. That output can be active low or active high as circumstances require. If we assume its output is active high then the negative recovery monostable multivibrator 53 will give an output high, for the time determined by accessory components, for a single input pulse. After that time its output will extinguish and revert to a low output state. If however another input pulse arrives before the output from the previous pulse has extinguished then the output will remain in a high output state for another time period. Accordingly, proper operation of the motor switch 16 will provide continual input to negative recovery monostable multivibrator 53 that ensure its output remains active. Additionally, failure of the motor switch 16 will result in an inactive state for recovery monostable multivibrator 53. It is understood that other circuits may accomplish the same results, for example a frequency-to-voltage converter combined with a comparator as described above.

The output of the negative recovery monostable multivibrator 53 serves as one input to a logic gate 55. The second input of the logic gate 55 is the output of the second voltage comparator 45 discussed below.

Overspeed detection module 22 operates in the manner set forth in relation to FIG. 4 with similar components having the same reference numbers. To integrate with the motor switch protection circuit 50, output from the second voltage comparator 45 and the monostable multivibrator 53 are input to a logic gate 55. When the inputs to the logic gate 55 indicate either an overspeed condition or a fused motor switch condition, the logic gate 55 will output a triggering signal to the switch drive circuit 46 which in turn closes the protective switch 24 of the disabling circuit. In an exemplary embodiment, the switch drive circuit 46 may be implemented by a gated monostable multivibrator, where the output from the logic gate is a reset input to the multivibrator, the output from a zero-cross detection circuit is a triggering input to the multivibrator, and the output of the multivibrator drives a transistor that closes the protective switch. The switch drive circuit 46 may include circuitry to ensure the output of the logic gate 55 exceeds some time limit before the switch drive circuit triggers the closing of the protective switch. Disabling circuit 23 operates in the manner set forth above to thereby short the AC line disable operation of the power tool.

Figure 6:
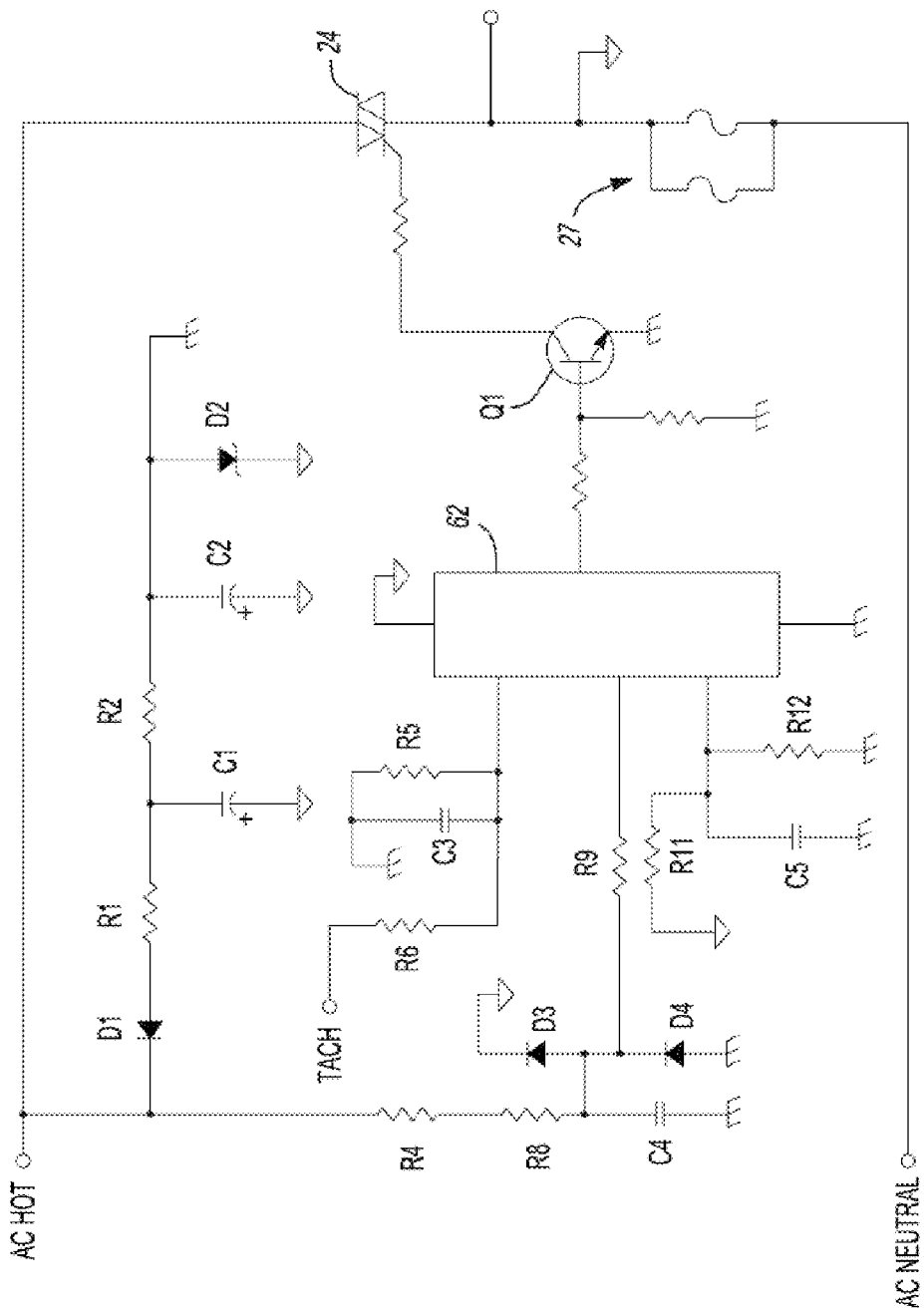
FIG. 6 is a schematic of an alternative embodiment of the overspeed detection module that uses a programmable microcontroller.

FIG. 6 depicts an alternative implementation of the overspeed detection module 22 that uses a programmable microcontroller. Tachometer 21 is again used to determine rotational speed of the motor. The tachometric signal is preferably filtered by a filtering circuit (comprised of R6, R5 and C3) prior to being input to the microcontroller 62.

The microcontroller 62 first converts the tachometric signal from an analog input signal to a digital signal. The microcontroller 62 employs an internal comparator to implement this function. The reference voltage for the internal comparator is developed across R11, R12 and C5 and input via a secondary input to the microcontroller 62. Output from the internal comparator is used as an interrupt to a free running counter. The value of the counter correlates to the period and thus the frequency of the tachometric signal. As noted above, the frequency of the tachometric signal is proportional to the rotational speed of the motor. Consequently, performing a numeric division with the counter value yields a quotient that is proportional to rotational speed of the motor. The counter is reset after the interrupt to enable continual monitoring of speed.

Lastly, the microcontroller 62 compares the quotient to a predefined threshold having a value corresponding to a maximum speed limit. When the quotient (and thus the motor speed) exceeds the threshold, the microcontroller 62 closes the protective switch 24, thereby shorting the line and blowing the fuse. More specifically, the microcontroller 62 turns on switch Q1 which in turns closes the protective switch 24. An exemplary power supply circuit is comprised of diodes D1, D2, resistors R1, R2 and capacitors C1, C2.

Because a fuse may not open within a single half-cycle of conduction, operation of the microcontroller 62 is preferably synchronized to the AC line. In the exemplary embodiment, a zero-cross detection circuit comprised of R4, R8, C4, D3, D4 and R9 enables the microcontroller 62 to synchronize with the AC line. With zero-crossing input, the microcontroller 62 is able to activate the protective switch 24 shortly after each AC line zero-cross, thereby ensuring the current will flow, sufficient to open the fuse. If one fuse does not meet the desired current rating, the two or more fuses may be placed in parallel to achieve the desired rating.

Figure 7:
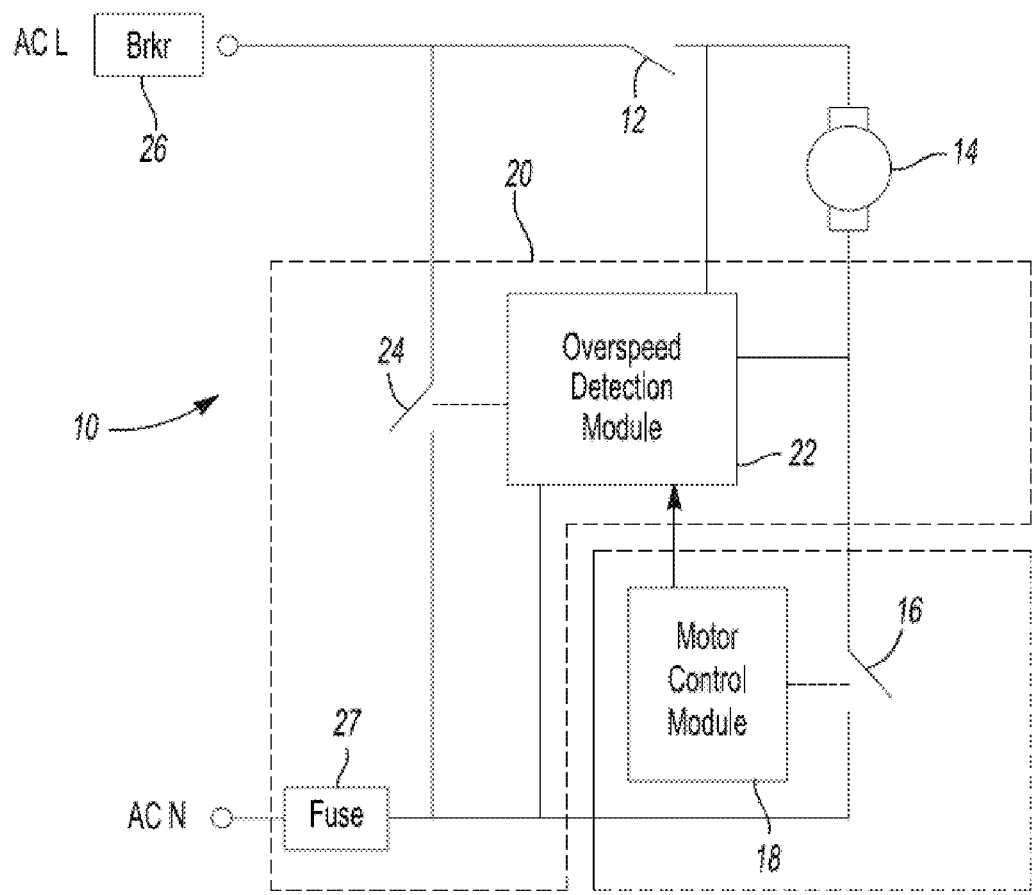
FIG. 7 is a block diagram depicting an exemplary embodiment of the overspeed detection module that determines rotational speed of the motor without the use of a tachometer.

FIG. 7 depicts an exemplary embodiment of the overspeed detection module 22 that determines rotational speed of the motor without the use of a tachometer or other direct speed sensing system. In this embodiment, the overspeed detection module 22 determines the rotational speed of the motor 14 indirectly from other system parameters. The overspeed detection module 22 is implemented preferably using a microcontroller although the microcontroller may be replaced in part or entirely by other types of circuit components that implement the functions set forth below.

In one exemplary embodiment, the overspeed detection module 22 receives a measure of current through the motor from a current sensor. For example, the current sensor may be a resistor connected in series with the motor, such that the overspeed protection module 22 measures the voltage across the terminals of the resistor. The overspeed protection module 22 then determines the rotational speed of the motor from the current measure. An exemplary technique for determining speed of the motor from a current measure is set forth in U.S. Pat. No. 5,986,417 which is incorporated by reference herein. The overspeed detection module 22 may also receive a measure of the voltage across the armature of the motor. In this case, the overspeed protection module 22 may determine the rotational speed of the motor 14 based on the measure of current through the motor as well as the voltage across the armature of the motor. This technique for determining speed is set forth in U.S. Pat. No. 7,518,324 which is also incorporated by reference herein.

In either case, the rotational speed of the motor is continually monitored by the overspeed detection module 22. Specifically, the rotational speed is compared to a predefined threshold in the manner described above. When the rotational speed of the motor exceeds the threshold, the overspeed detection module 22 acts to disable the motor 14; otherwise, the speed detection module 22 continues to monitor motor speed.

In the context of a phase-controlled motor switch, the overspeed detection module 22 may be further configured to receive the conduction angle (or its complement, firing point) at which the motor switch is closed. In an alternative embodiment, the overspeed detection module 22 determines rotational speed of the motor as a function of the conduction angle and the measured current through the motor. Basis for this new technique for deriving rotational speed is further described below.

For a given power tool, a functional relationship between the conduction angle, the measured current through the motor and the rotational speed of the motor was discovered by the applicant. Empirical data for the tool was derived during motor performance over a series of stepped loads from 0.1 to 120 in.-lbs. Simultaneous measurements of firing point, current and motor speed were collected during the motor performance, where current measures are further defined as the average current through the motor during one or more AC half-cycles.

Figure 8:
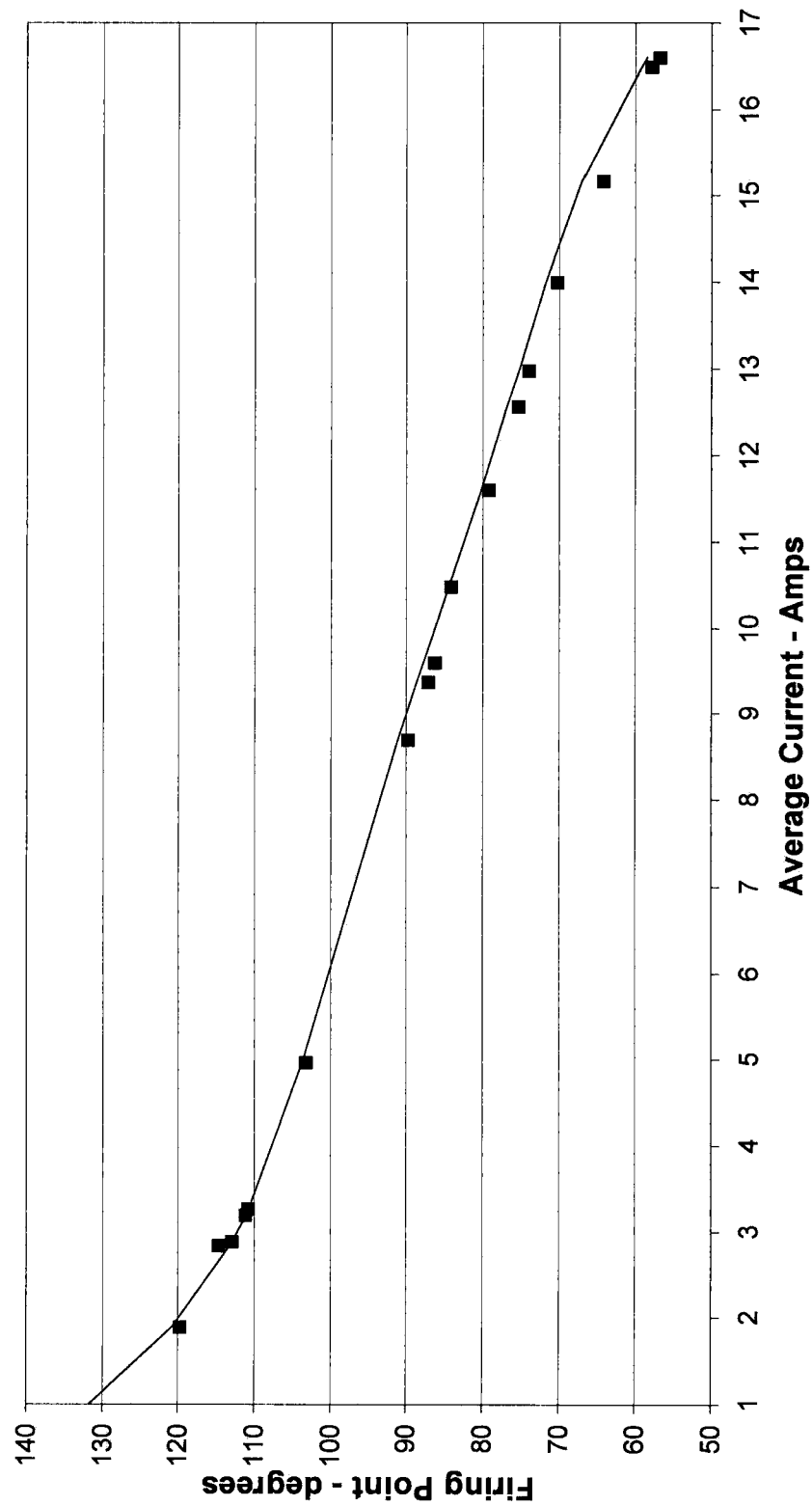
FIG. 8 is a graph illustrating the functional relationship between firing point and average current for a given power tool.

FIG. 8 illustrates the functional relationship between the firing point and the average current measure for a fixed speed. The exemplary curve in FIG. 8 is an isotach of 1,000 rpm being measured at the output of the tool. Of note, the data can be fit with a mathematical expression or function. In this case, a fifth degree polynomial was used to represent the data. The polynomial may be expressed generically as motor speed=$c_{i5}*1^5+c_{i4}*1^4+c_{i3}*1^3+c_{i2}*1^2+c_{i1}*1+c_{i0}$, where 1 is the measured current during the current AC line cycle, FP is the firing point setting for the current AC line cycle and $c_{iy}$ are constant coefficients such that y demotes the degree of the term in the polynomial expression. It is understood that polynomials having different degrees may be used to fit the data and that curve fitting may be accomplished using known mathematical techniques. The empirical data was obtained from a tool having a variable speed dial that enables the operator to set a maximum speed for the tool, where the speed dial was set to 1,000 rpm.

Figure 9:
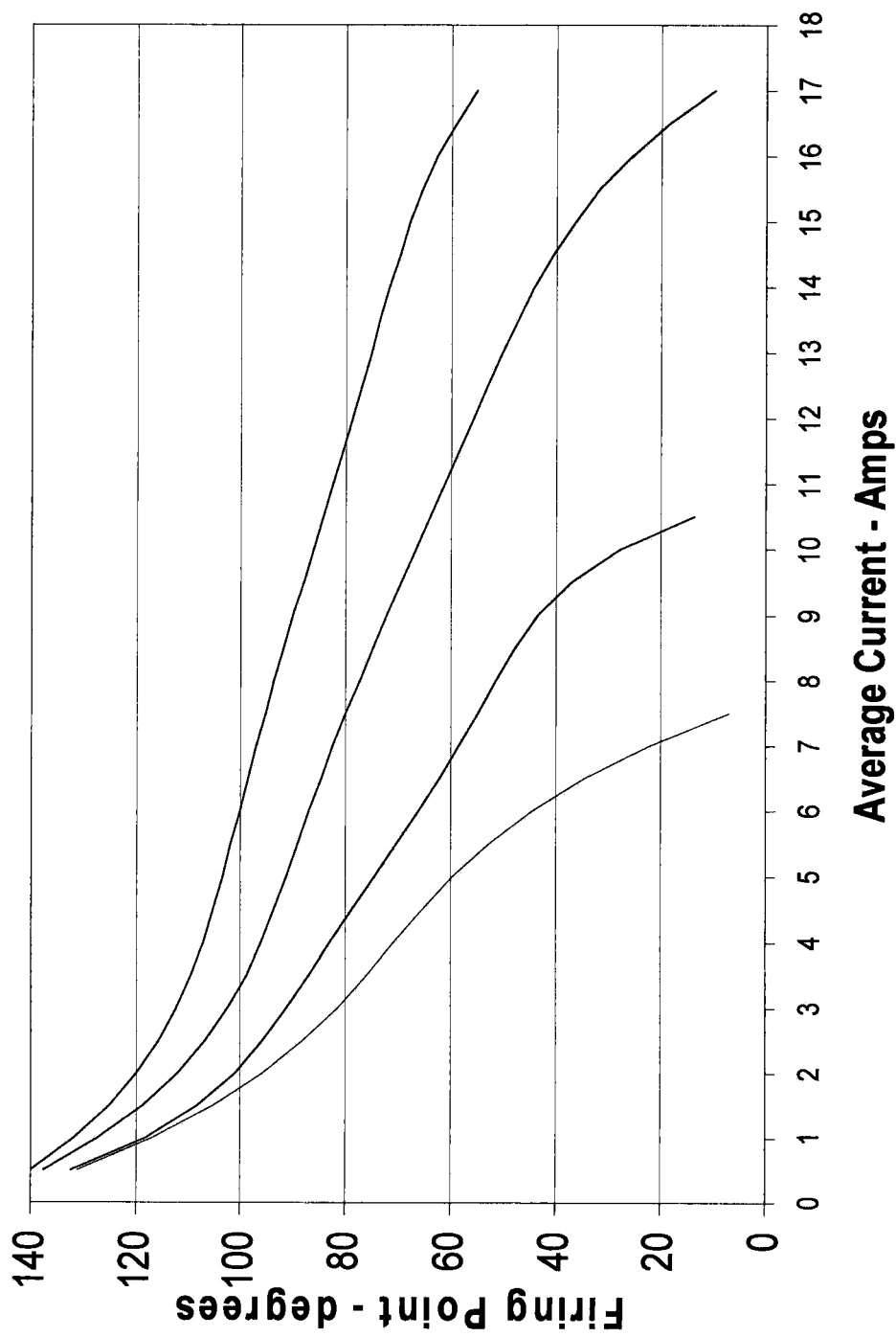
FIG. 9 is a graph illustrating the functional relationship between firing point and average current for various speed dial settings.
Figure 10:
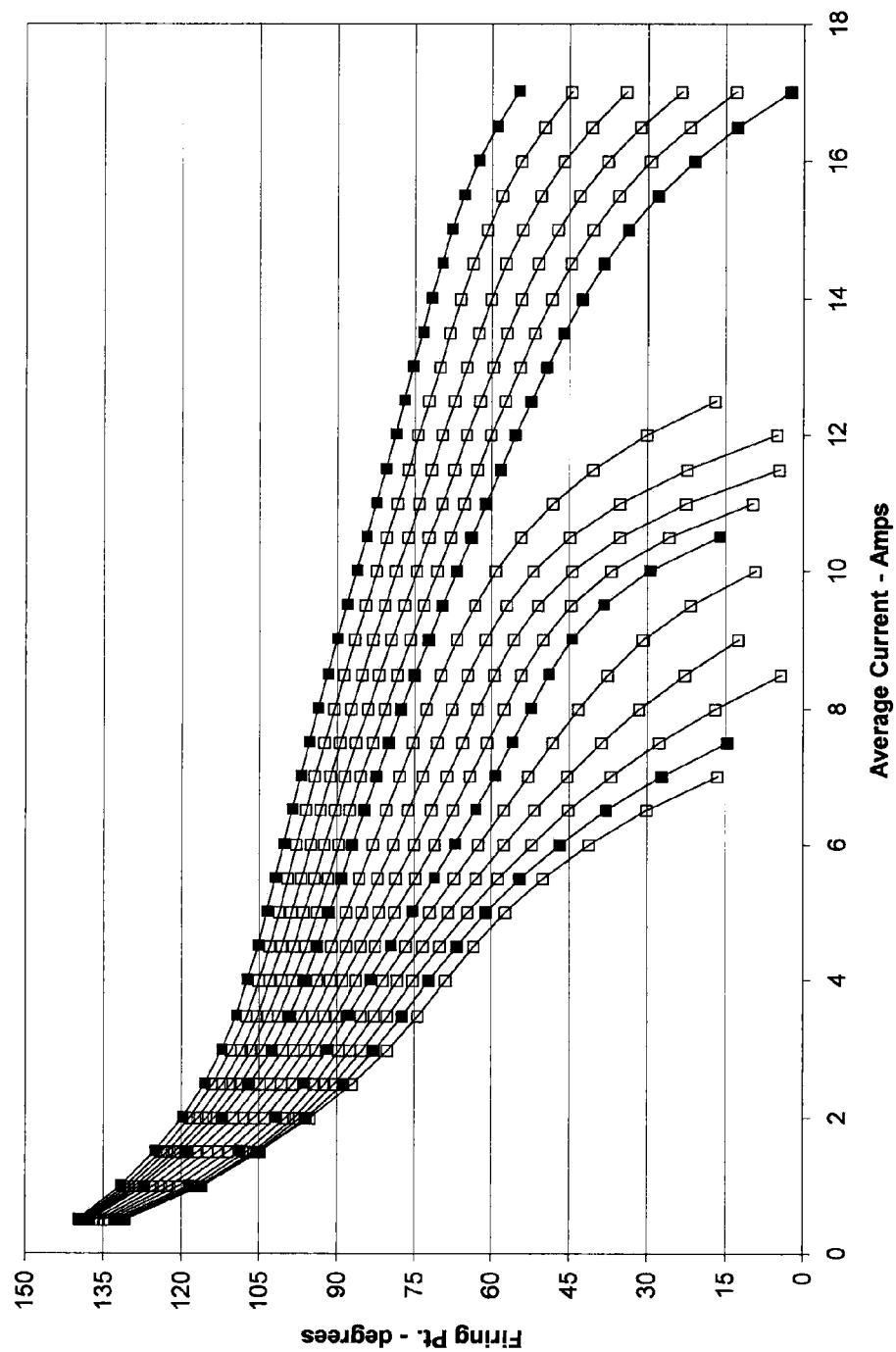
FIG. 10 is a graph illustrating a family of curves that be produced from the polynomials in FIG. 9.
Figure 11A:
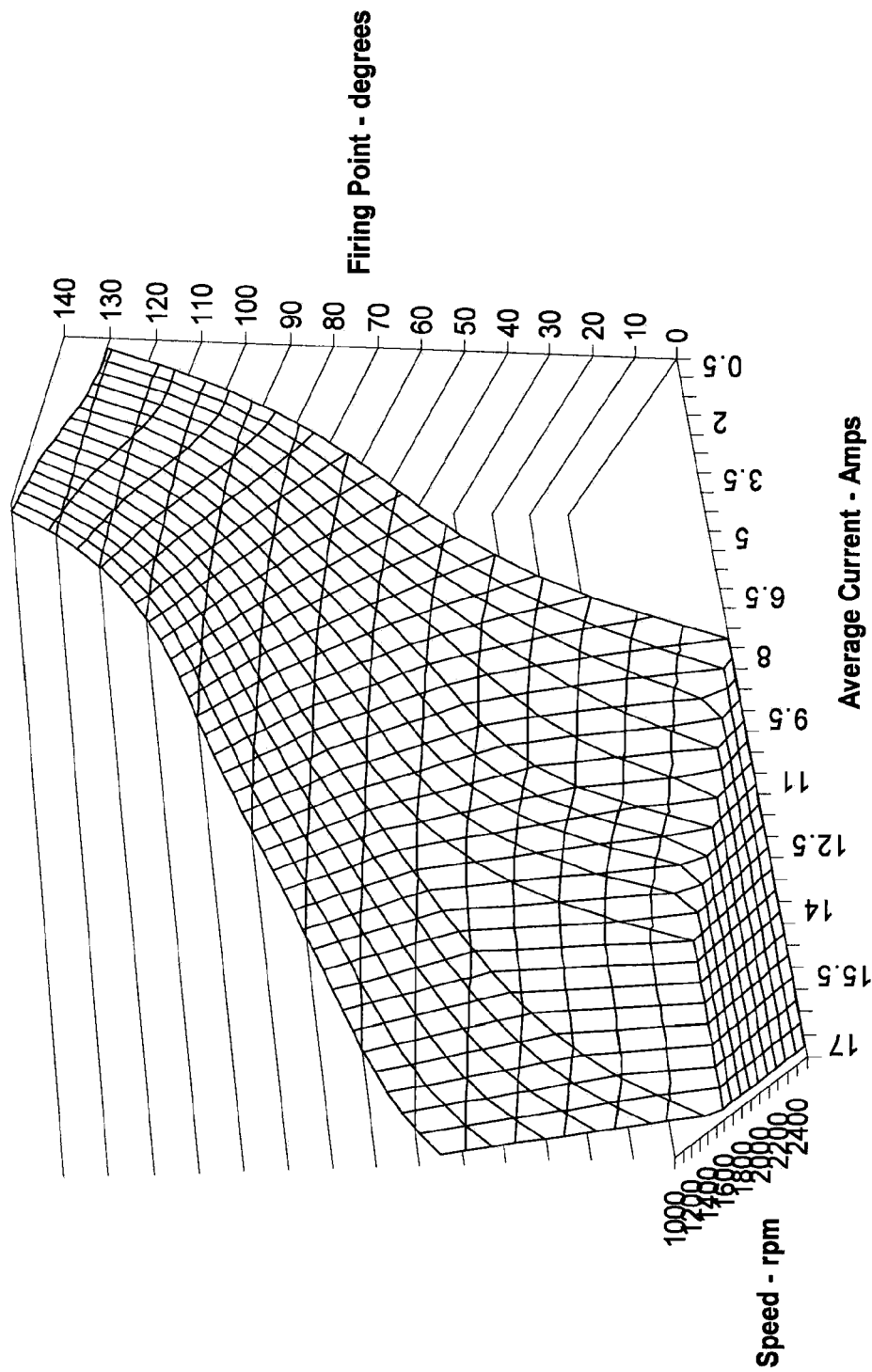
FIGS. 11A and 11B are graphs illustrating a surface that can be produced from the polynomials in FIG. 10.
Figure 11B:
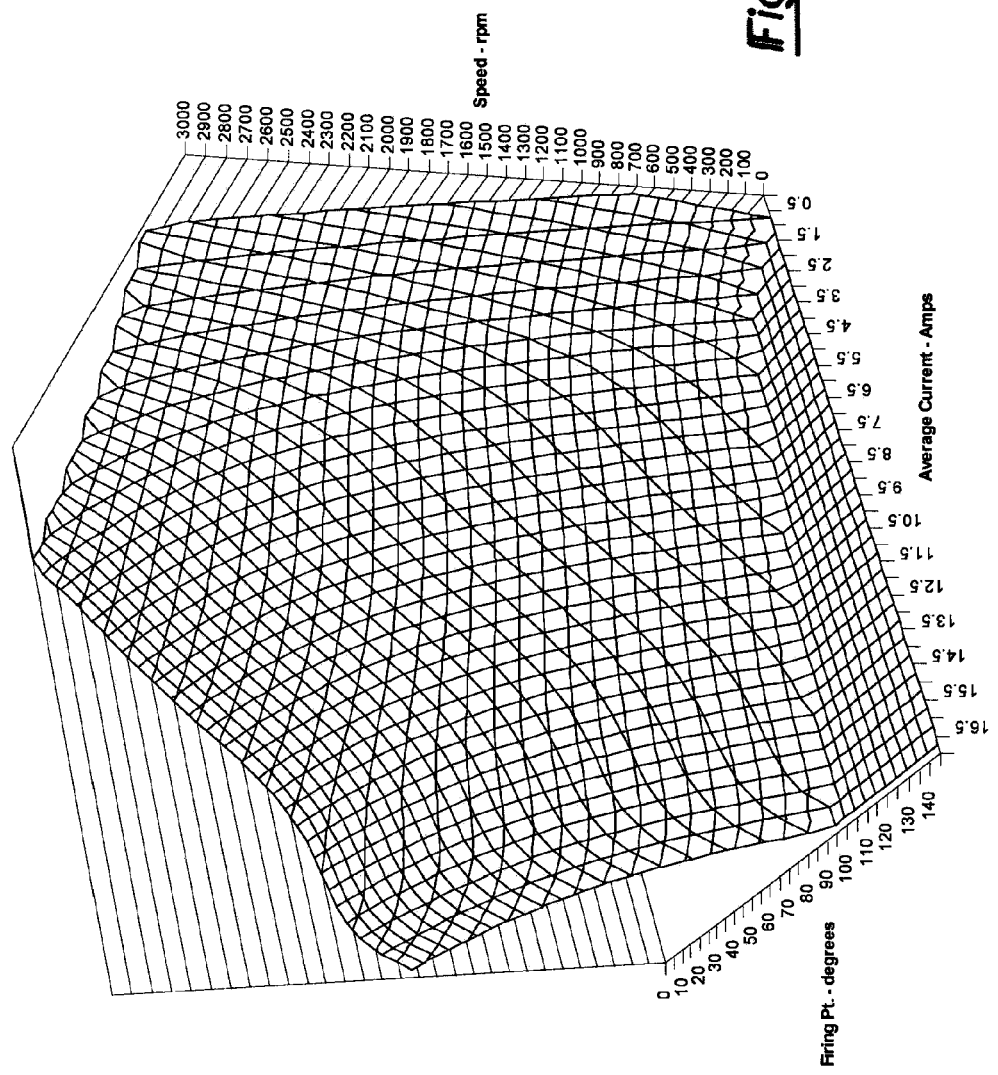

FIG. 9 illustrates the functional relationship between firing point and the average current measure for various speed dial settings. By interpolating between the polynomials show in FIG. 9, a family of curves can be produced as shown in FIG. 10 or a surface as shown in FIG. 11B. One means to develop the family of curves in FIG. 10 from the polynomials shown in FIG. 9 is to interpolate between the various coefficients, ($c_{10A}$, $c_{10B}$, $c_{10C}$, $c_{10D}$) ... ($c_{15A}$, $c_{15B}$, $c_{15C}$, $c_{15D}$), where A, B, C, and D represent of each of the four polynomials shown in FIG. 9 and $c_{ixy}$ represents the $X^{th}$ degree coefficient of polynomial Y. FIG. 10 is the result of such an interpolation and leads to the development of an equation for a surface of firing point as a function of speed and current, as shown in FIG. 11A, and speed as a function of current and firing point, as shown in FIG. 11B. Such a surface can be described by an equation like:

$$\text{Speed} = k_{I5}*I^5 + k_{I4}*I^4 + k_{I3}*I^3 + k_{I2}*I^2 + k_{I1}*I + k_{I0} + k_{FP5}*FP^5 + k_{FP4}*FP^4 + k_{FP3}*FP^3 + k_{FP2}*FP^2 + k_{FP1}*FP,$$

where speed is the rotational speed of the power tool, I is current as described above, FP is the firing point as described above, and $k_{I0}$-$k_{I5}$ and $k_{FP1}$-$k_{FP5}$ are constants determined according to some mathematical curve-fitting technique. It is understood that polynomials having different degrees may be used to fit the data and that curve fitting may be accomplished using known mathematical techniques. It is further understood that other functions besides polynomials may describe the relationship between current, firing point, and speed. It is further understood that tables of values may be used to describe functions and that interpolation between values in tables may also be incorporated. It is further understood that other measurements and parameters may be incorporated into a formula, a function, or a table for the purpose of determining speed other than the current and firing point used here to teach the method.

Thus, it has been shown that speed may be derived as a function of two independent variables: firing point and average current. Given this functional relationship, rotational speed can be reliably computed from the firing point and average current for purposes of overspeed detection and protection. It is envisioned that this relationship may also be used for other purposes such as maintaining tool speed at a given set point.

During a development phase and prior to commercialization, a given power tool is instrumented to collect the necessary parameters for computing the functional relationship between motor speed, firing point and average current for the given power tool or power tool family. This data is then used to derive one or more polynomials which may be used to compute motor speed and, more particularly, the coefficients for the polynomials. The polynomials are in turn used by an overspeed detection module 22 residing in the tool to implement overspeed protection.

Figure 12:
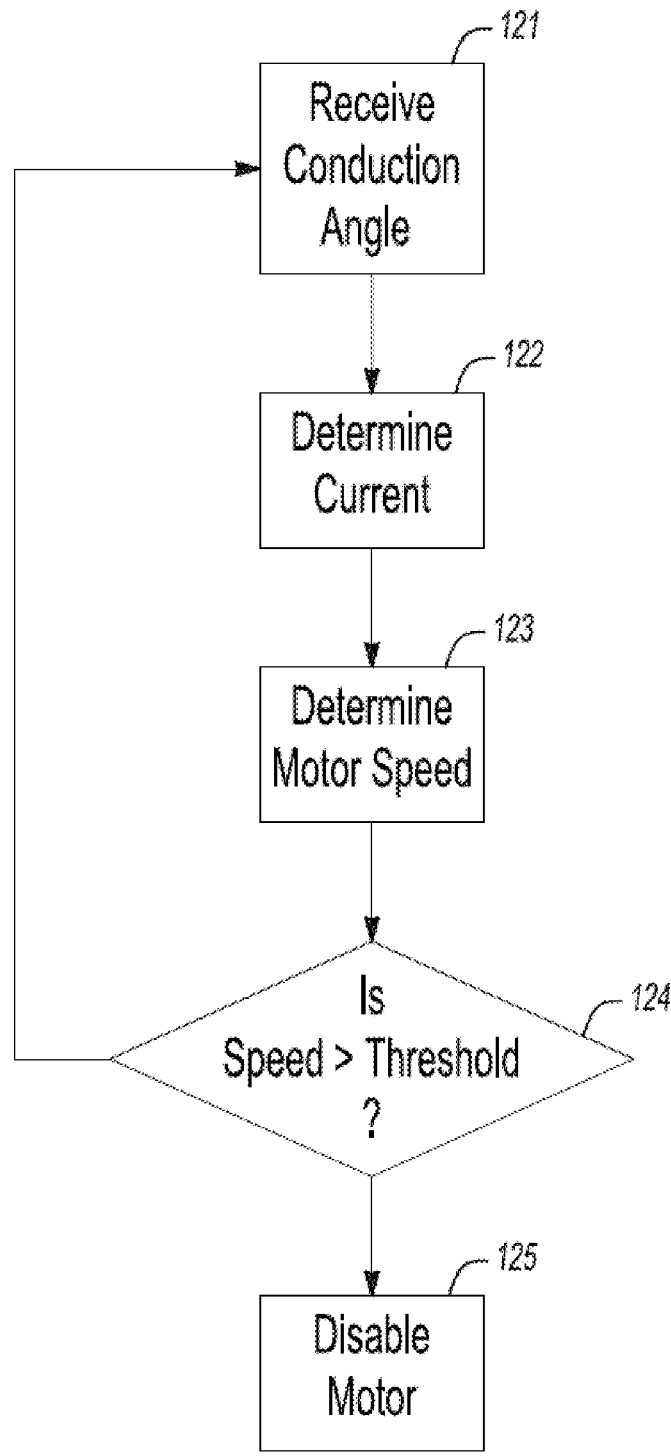
FIG. 12 is a flowchart for determining rotational speed of the motor as a function of the conduction angle and the measured current.

With reference to FIG. 12, the overspeed detection module 22 is configured to receive the conduction angle (or its complement, firing point) at 121 from the motor control module 18. During motor operation, the motor control module 18 drives the conductive state of the motor switch 16 in accordance with a conduction angle computed for each AC line cycle. This conduction angle for each AC line cycle is reported to the overspeed detection module 22. The overspeed detection module 22 also measures the current through the motor during each AC line cycle as indicated at 122. Conduction angle and its corresponding current measure taken during the same AC line cycle are used to compute motor speed at 123 as further described below. In an exemplary embodiment, a predefined number of sampled current measurements are taken during a given AC line cycle and averaged to provide the current measure for the given AC line cycle. At lower motor speeds, current measures are less reliable. Therefore, it is contemplated that current measures may be determined across multiple AC line cycles. For example, average current may be determined for a set number of line cycles (e.g., the preceding 32 line cycles) which are likewise averaged together to form multi-cycle current measure. The multi-cycle current measure may be used in place of the one-cycle current measure when computing motor speed. The multi-cycle current measure has been shown to be a more stable and accurate measure of current through the motor, particularly at lower motor speeds.

In one exemplary embodiment, the speed detection module 22 uses a polynomial to compute motor speed, where the polynomial represents a surface such as the one shown in FIG. 11B. Coefficients for the polynomial are stored in a memory device and accessible by the speed detection module. For each AC line cycle, the speed detection module 22 computes the motor speed using the conduction angle and current measure. The computed speed is compared to a predefined threshold that signifies a maximum speed limit for the tool. When the rotational speed of the motor exceeds the threshold, the overspeed detection module 22 acts to disable the motor; otherwise, the speed detection module continues to monitor and compute motor speed during each AC line cycle. It is envisioned that such computations may only occur every x number of AC line cycles, where x is an integer greater than 1.

Alternatively, the speed detection module 22 may access a table, where each table entry represents a current limit correlated to a speed limit. For example, each value in the table is addressed by a conduction angle. Given a conduction angle, the speed detection module 22 accesses to the table to retrieve a current limit. The speed detection module may employ an interpolation method to compute the value that most closely correlates to the given conduction angle. The speed detection module 22 then compares the current measure to the retrieved current limit as indicated at 124. If the current measure exceeds the current limit, then motor speed is too high and the overspeed detection module acts to disable the motor at 125; otherwise, the speed detection module continues to monitor motor speed in this manner.

As an example, consider a table of 256 values. The index for the table is a number from 0 to 255, being the firing point during the AC line cycle of the previous current measurement. The values in the table are current limits of various and sundry values, each value having been predetermined as appropriate for its particular firing point. To retrieve a value from the table, the firing point index is added to the base address of the table to obtain the absolute address for the table value of interest. The output value of the table is the contents of memory pointed to by that absolute address. This output value is the current limit retrieved from the table, to be used for testing the measured current of the previous AC line cycle, as described above. This one-dimensional table is not meant to limit the scope of this invention. It is understood by those skilled in the art that two-dimensional tables or multi-dimensional tables may be employed with appropriate modifications.

Figure 13:
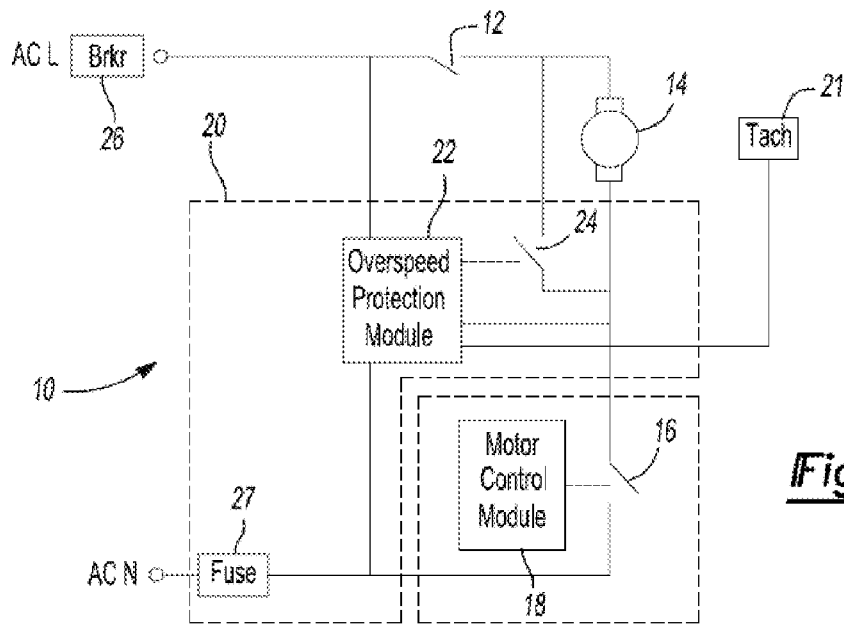
FIG. 13 is a circuit diagram for a motor control system having a protective switch across the motor.

FIG. 13 illustrates another alternative circuit arrangement for the motor control system. In this arrangement, the protective switch 24 is connected across the motor. This arrangement alleviates the need for sensing the state of the power on/off switch. When the power on/off switch is off (i.e., open position), there is no voltage across the motor switch so that the protective control module closes the protective switch. Any current shorted around the motor is not sufficient to trip the breaker or blow the fuse when the power on/off switch is in an off position. Conversely, when the power on/off switch is on (i.e., closed position), the protective control module 22 operates in the manner described above in relation to FIG. 1.

Figure 14:
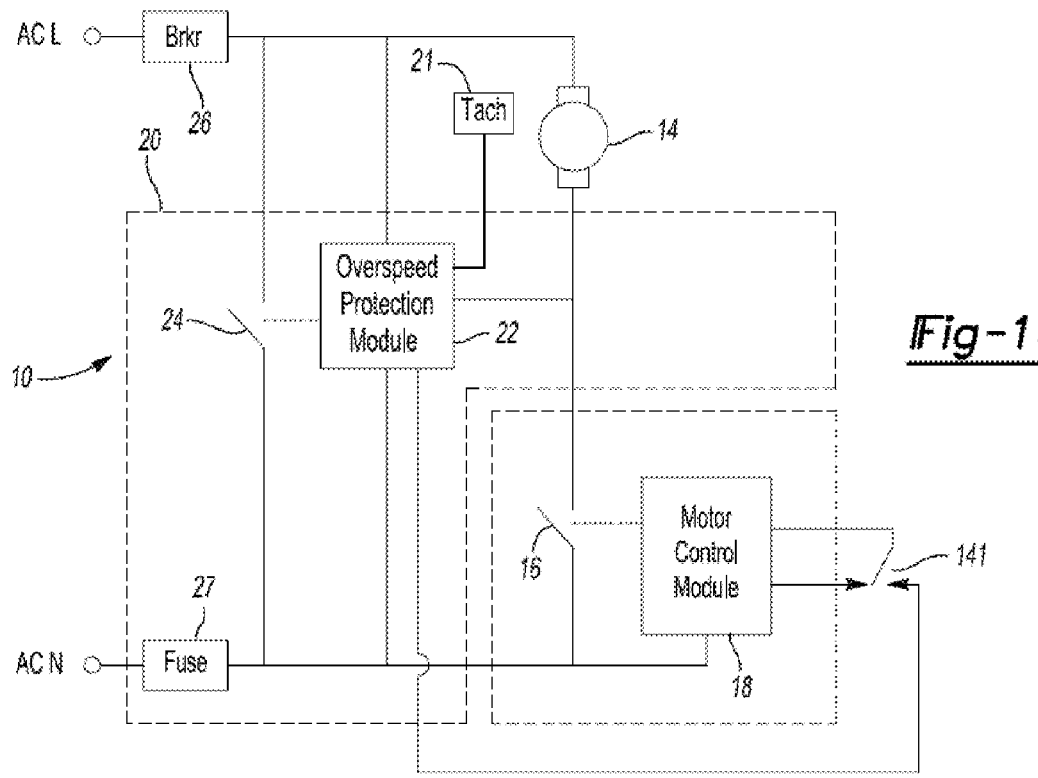
FIG. 14 is a circuit diagram for a motor control system having a power on/off switch that does not conduct the power delivered to the motor.

Preceding embodiments contemplate a power on/off switch that is disposed between the AC power source and the motor such that the power delivered to the motor is conducted through the power on/off switch. FIG. 14 illustrates an alternative embodiment of an overspeed protection module that is suitable for use with a power on/off switch that does not conduct the power delivered to the motor. In this exemplary embodiment, the power on/off switch 91 is interfaced with the motor control module 18 and provides an indicator thereto as to whether a user desires the tool to be operational or not. The motor control module 18 may in turn control the amount of voltage applied to the motor 14 in the manner described above. The power on/off switch 141 may be implemented as a push button, a sliding switch or some other type of "logic" switch. Rather than being connected across the AC line, it is also envisioned that the protective switch 24 may be connected across the motor 14.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A power tool powered by an alternating current (AC) input signal, comprising:
    a motor switch coupled in series with an electric the motor;
    a motor control module interfaced with the motor switch and controls switching operation of the motor switch, wherein the motor control module is implemented by computer executable instructions executed by a computer processor;
    an overspeed detection module that is separate from the computer processor and operates independently from the computer processor to determine rotational speed of the motor and issues a disabling signal to the motor control module when the rotational speed of the motor exceeds a threshold, wherein the motor control module opens the motor switch in response to the disabling signal from the overspeed detection module, thereby discontinuing motor operation; and
    a protective switch connected across an AC line carrying the AC input signal and a fuse disposed in the AC line, where overspeed detection module closes the protective switch when the rotational speed of the motor exceeds the threshold, thereby shorting the AC line and opening the fuse.

2. The power tool of claim 1 wherein the overspeed detection module includes a tachometer disposed proximate to the motor and configured to determine the rotational speed of the motor.

3. The power tool of claim 1 wherein the overspeed detection module measures current through the motor and determines the rotational speed of the motor based on the measured current.

4. The power tool of claim 1 wherein the power tool is powered by an alternating current (AC) input signal and the switching operation of the motor switch occurs at a given phase of the AC input signal.

5. The power tool of claim 4 wherein the overspeed detection module receives the given phase from the motor control module, measures current through the motor, and determine the rotational speed of the motor as a function of the given phase and the measured current.

6. The power tool of claim 4 further comprises a protective switch connected across the motor and a fuse disposed in the AC line, where the overspeed detection module closes the switch when the rotational speed of the motor exceeds the threshold, thereby shorting the AC line and opening the fuse.

7. A power tool powered by an alternating current (AC) input signal, comprising:
    a motor switch coupled in series with an electric the motor;
    a motor control module interfaced with the motor switch and controls switching operation of the motor switch, wherein the motor control module is implemented by computer executable instructions executed by a computer processor;
    an overspeed detection module that is separate from the computer processor and operates independently from the computer processor to determine rotational speed of the motor and operates cooperatively with the motor control module to reduce the rotational speed of the motor when the rotational speed of the motor approaches but is less than a maximum speed threshold; and
    a protective switch connected across an AC line carrying the AC input signal and a fuse disposed in the AC line, where overspeed detection circuit closes the switch when the rotational speed of the motor exceeds the threshold, thereby shorting the AC line and opening the fuse.

8. The power tool of claim 7 wherein the overspeed detection module includes a tachometer disposed proximate to the motor and configured to determine the rotational speed of the motor.

9. The power tool of claim 7 wherein the overspeed detection module measures current through the motor and determines the rotational speed of the motor based on the measured current.

10. The power tool of claim 7 wherein the power tool is powered by an alternating current (AC) input signal and the switching operation of the motor switch occurs at a given phase of the AC input signal.

11. The power tool of claim 10 wherein the overspeed detection module receives the given phase from the motor control module, measures current through the motor, and determine the rotational speed of the motor as a function of the given phase and the measured current.

12. The power tool of claim 10 wherein the motor control module reduces the rotational speed of the motor by varying the phase at which the motor switch is closed.

13. A power tool configured to receive an alternating current (AC) input signal, comprising:
an electric motor;
a phase-controlled switch coupled in series with the motor;
a motor control module interfaced with the phase-controlled switch and modulates the conductive state of the phase-controlled switch at a given phase of the AC input signal, wherein the motor control module is implemented by computer executable instructions executed by a computer processor; and
an overspeed detection module that is separate from the computer processor and configured to receive the given phase from the motor control module, the overspeed detection module operates to measure current through the motor and to determine rotational speed of the motor as a function of the given phase and the measured current; and
a protective switch connected across an AC line carrying the AC input signal and a fuse disposed in the AC line, where overspeed detection module closes the switch when the rotational speed of the motor exceeds a threshold, thereby shorting the AC line and opening the fuse.

14. The power tool of claim 13 wherein the overspeed detection module determines rotational speed using a function defined as a linear combination of the predetermined phase and the measured current.

15. The power tool of claim 13 wherein the overspeed detection module samples current through the motor during a single period of the AC input signal and averages the current samples to derive the current measure.

16. The power tool of claim 13 wherein the overspeed detection module samples current through the motor during multiple periods of the AC input signal and averages the current samples to derive the current measure.

17. The power tool of claim 13 further comprises a protective switch connected across an AC line carrying the AC input signal and a fuse disposed in the AC line, where overspeed detection module closes the switch when the rotational speed of the motor exceeds the threshold, thereby shorting the AC line and opening the fuse.

18. The power tool of claim 13 further comprises a protective switch connected across the motor and a fuse disposed in the AC line, where the overspeed detection module closes the switch when the rotational speed of the motor exceeds the threshold, thereby shorting the AC line and opening the fuse.

* * * * *